June 13, 1939.  G. A. PAGE, JR  2,162,227

PRESSURE FUSELAGE

Filed Jan. 13, 1938

INVENTOR
GEORGE A. PAGE JR.
BY
ATTORNEY

Patented June 13, 1939

2,162,227

UNITED STATES PATENT OFFICE 2,162,227

PRESSURE FUSELAGE

George A. Page, Jr., Ferguson, Mo., assignor to Curtiss-Wright Corporation, a corporation of Delaware

REISSUED

MAY 13 1941

Application January 13, 1938, Serial No. 184,741

3 Claims. (Cl. 244—119)

This invention relates to aircraft fuselages being particularly concerned with improvements in connection with fuselages for high altitude aircraft in which it is desired to maintain a higher pressure within the fuselage than exists in the atmosphere surrounding same.

In the prior art, effort has been expended to provide pressure cabins in aircraft fuselages in which the air is maintained at substantially ground pressure although the aircraft itself may be at high altitude whereat the atmospheric pressure may be somewhat less than one-half the pressure within the cabin. Accordingly, the cabin becomes a pressure tank which must be designed to effectively sustain internal pressure without failure. At the same time it is necessary to maintain the external fuselage form as an effective streamline body. Some of the prior attempts in this direction have comprised the housing of a cylindrical compartment within a streamlined fuselage, but this is undesirable as it virtually doubles the fuselage weight.

An object of this invention is to provide a fuselage construction wherein the fuselage skin in itself forms a pressure chamber, certain means being provided so that the fuselage has high efficiency as a pressure reservoir and likewise is of the form appropriate to an aerodynamic body.

A further object is to provide a fuselage so arranged as to provide cabin accommodations and a generous cargo space, both subject to the maintenance of higher pressures within the fuselage than outside thereof.

Further objects will become apparent in reading the annexed specification in connection with the drawing in which.

Figure 1:
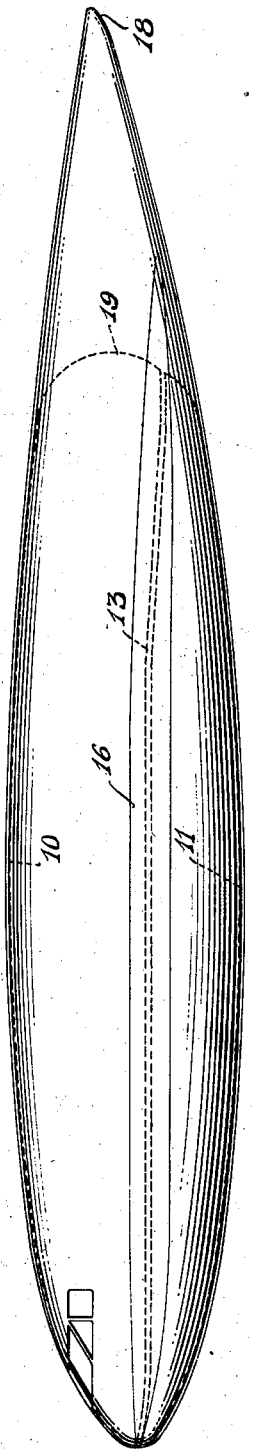
Fig. 1 is a side elevation of a fuselage according to this invention.

The figures of the drawing illustrate a streamlined aerodynamic body of optimum form wherein the height is somewhat greater than the width and the section of the body partakes of oval form. It will be realized, however, that if the body is to form a pressure tank, an oval section is undesirable since pressure within the tank would tend to expand the flatter sides of the oval urging the whole body toward a circular shape. Accordingly, the fuselage is constructed of two arcuate sections, indicated respectively as 10 and 11. The angular extent of the section 10 is greater than 180° while as shown, the arcuate extent of the section 11 is approximately 180°. However, the respective radii of the sections are eccentric and are such that the intersections of the two arcs subtend a chord C and the intersections of respective sections form inwardly protruding cusps 12. The cusps 12 are joined by a tension member 13 equivalent in length to the chord C. The tension member 13 when projected longitudinally of the fuselage forms a substantially plane diaphragm which, when structurally braced in a manner well-known in the art may serve as a floor for the cabin space 14 embraced by the section 10 and member 13. Correspondingly, the space 15 embraced by the section 11 and the member 13 may form a baggage compartment of generous size yet of somewhat smaller capacity than the space 14.

The cusps 12 provide longitudinal indentations in the exterior form of the fuselage and these indentations may either be left intact to provide a distinguishing mark for this type of fuselage, or, if desired, fairings 16 may be used to fill out the indentations, the fairings being tangent to respective sections 10 and 11 and bridging the indentations.

Figure 2:
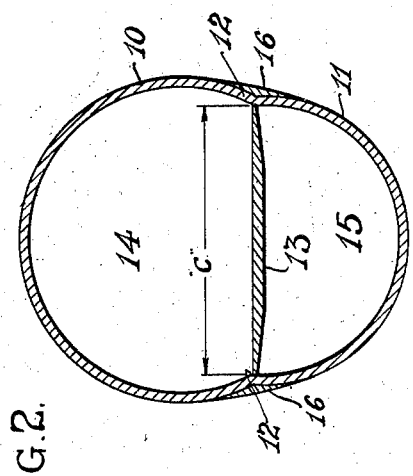
Fig. 2 is a typical section through a mid-portion of the fuselage.

The nose of the fuselage which normally is occupied by the aircraft crew may be constructed throughout according to the above indicated teachings, while the tail of the fuselage which tapers to a point as at 18, may be in the form of a false fairing extending rearwardly from the rear wall 19 of the pressure cabin. Said rear wall will be formed by spherical segments similar in construction to the sections shown in Fig. 2.

By utilizing arcuate skin sections it will be obvious that pressure may be maintained within the fuselage without deforming the sectional profile of the body, the member 13 assuming tension stresses which normally would tend to spread the cusps 12 apart. Thus, by the novel construction above described I may utilize a single skin which forms at the same time a pressure cabin and pressure baggage compartment, and, an external fuselage form of optimum form characteristics.

It is understood that the fuselage herein disclosed would include necessary longitudinal and circumferential structural bracing in the manner well-known in the art. Preferably, the fuselage would be constructed in monocoque form.

While I have described my invention in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a pressure fuselage, an upper arcuate member embracing an arc greater than 180°, a lower member struck on a smaller radius and of an arcuate extent to make the chord thereof substantially equal to the chord of the upper member, said members being joined at their edges to effect a superpositioning of their respective chords, and tie elements joining the respective edges of said members comprising tension elements reinforced against bending to provide a floor for a cabin defined between the floor and said upper arcuate member.

2. A fuselage comprising upper and lower arcuate sections of respectively greater and lesser radius joined at their edges to form inwardly projecting cusps, a plane tension member joining said cusps said member being transversely reinforced to assume bending loads when used as a floor, and fairings bridging the indentations on the exterior surface of the fuselage formed by said inwardly projecting cusps.

3. A fuselage comprising an upper arcuate section subtending an angle of more than 180°, a lower arcuate section of smaller radius joined at its edges to the edges of said upper section and depending therebelow, and a substantially plane tension diaphragm joining respective edges and comprising a chord of said arcuate sections, said diaphragm being reinforced against bending deflection to provide a floor for the upper section of the fuselage and comprising a tension member across the fuselage resisting spreading of the intersections of said arcuate sections.

GEORGE A. PAGE, Jr.